(12) United States Patent
Vollom (10) Patent No.: US 6,298,587 B1
(45) Date of Patent: Oct. 9, 2001

(54) MULTIPLE ORIENTATION THREE DIMENSIONAL IMAGE SCREEN

(76) Inventor: Paul A. Vollom, 38830 Old Hwy 80, Boulevard, CA (US) 91905

( * ) Notice: Subject to any disclaimer, the term of this patent is extended or adjusted under 35 U.S.C. 154(b) by 0 days.

(21) Appl. No.: 09/321,270

(22) Filed: May 27, 1999

Related U.S. Application Data (60) Provisional application No. 60/087,563, filed on Jun. 1, 1998.

(51) Int. Cl.$^7$ .................................................. A47F 11/06
(52) U.S. Cl. ............................ 40/427; 33/514.2; 33/561.1
(58) Field of Search ..................... 40/427, 579; 446/118; 33/515, 514.2, 512, 561.1

(56) References Cited

U.S. PATENT DOCUMENTS

| | | | | |
|---|---|---|---|---|
| 388,841 | * | 9/1888 | Davenport et al. ................. | 33/561.1 |
| 1,019,923 | * | 3/1912 | Schelter ............................. | 33/561.1 |
| 2,163,938 | * | 6/1939 | Dickson ............................ | 33/561.1 |
| 2,266,457 | * | 12/1941 | Wolff ................................. | 33/561.1 |
| 2,523,647 | * | 9/1950 | Burk ................................... | 33/514.2 |
| 2,612,700 | * | 10/1952 | Frisk ................................... | 33/561.1 |
| 2,621,415 | * | 12/1952 | Cooper .............................. | 33/561.1 |
| 2,949,674 | * | 8/1960 | Wexler ............................... | 33/561.1 |
| 3,568,357 | | 3/1971 | Lebensfeld ......................... | 46/17 |
| 4,265,024 | * | 5/1981 | Handte ............................... | 33/519 |
| 4,454,618 | | 6/1984 | Curchod ............................. | 12/1 R |
| 4,536,980 | * | 8/1985 | Fleming ............................. | 40/427 |
| 4,654,989 | | 4/1987 | Fleming ............................. | 40/427 |
| 4,876,758 | | 10/1989 | Rolloff et al. ..................... | 12/142 N |
| 4,936,560 | * | 6/1990 | Barozzi .............................. | 269/266 |
| 4,956,924 | * | 9/1990 | Hu ..................................... | 33/561.1 |
| 5,092,591 | | 3/1992 | Tol ..................................... | 272/131 |
| 5,391,105 | | 2/1995 | Jones ................................. | 446/219 |
| 5,689,446 | | 11/1997 | Sundman et al. .................. | 364/560 |
| 5,796,620 | * | 8/1998 | Laskowski et al. ................ | 700/197 |

FOREIGN PATENT DOCUMENTS

| | | | |
|---|---|---|---|
| 2357621 | 5/1975 | (DE) ..................................... | 40/579 |
| 907977 | 3/1946 | (FR) ..................................... | 33/512 |
| 2037471 | 7/1980 | (GB) .................................... | 40/579 |
| 55-119002 | 9/1980 | (JP) ..................................... | 33/515 |

OTHER PUBLICATIONS

The Tactile Multiple, by John Ballantine Art in America p.141, Jul. 1978.

The Animation Book, by Kit Laybourne pp. 152,153,154, 1979.

Science Center of Minn., Personal Observation (Vollom), 1971.

* cited by examiner

*Primary Examiner*—Anthony Knight
*Assistant Examiner*—Andrea Chop (57) ABSTRACT

A three dimensional impression pin screen has two parallel axially aligned perforated spaced plates. Apertures of each plate have a plurality of pins passing through them which have a head on one end and a cap on the other. The heads and caps prevent the pins from passing out of the plates given any orientation of the pin screen. Magnetic strips or pressure strips equal in width to the spacing between the plates contact the shanks of rows or a row of pins between the plates. Strips magnetized on both sides are used to contact the shanks of pins of two adjacent rows. Each magnetic strip is longer than the pin filled apertures of adjacent rows. Each pressure strip contacts a single row of pins. The strips are of a thickness less than the spacing between the shanks of pins in adjacent rows which have the same aperture spacing. Pins are held in displaced positions by attraction to the magnetic strips or by resistance against the pressure strips. This allows for a semi-permanent impression to be retained in any orientation of the device until the pins are intentionally displaced to another position.

11 Claims, 6 Drawing Sheets

MULTIPLE ORIENTATION THREE DIMENSIONAL IMAGE SCREEN

This application claims the benefit of U.S. Provisional Application No. 60/087,563 filed on Jun. 1, 1998.

BACKGROUND

1. Field of the Invention

This invention relates to three dimensional pin impression screens.

2. Description of Related Art

The three dimensional image forming pin screen is very familiar to the general public. In the last 27 years there have been a number of variations on it.

The inventor's first exposure to pin screens was encountering a display in the Science Center of Minnesota in the summer of 1971. This display had a single perforated metal plate in a frame approximately 20" by 40" laying horizontal and supported by pillars above a pedestal. A clear cover was over the top of the unit and lay parallel to the surface of pin heads about ¾" above them. The pins heads rested against the perforated plate and their shanks protruded about 1½" below. Pushing from underneath with a hand reproduced an image of the hand in the pins above. This pin screen and a version manufactured later by Ballantine & Co. ( Art in America, p.141, July 1978) only retained the image if the object was pressed into the pins. Work earlier by Alexeieff & Parker ( ASIFI Information Bulletin, pp. 90–99, 1972) and discussed later by Laybourne (The Animation Book, pp. 152–154, 1979) used a vertical pin screen. This device had a second axially aligned perforated plate mounted parallel to the first. Provided they were not pushed beyond the apertures of the plates, these pins remained horizontal.

This device was able to produce an image used for animation art. The pins were capable of movement of a few millimeters, their black heads being located varying distances from the white background of the first perforated plate they were inserted into. This produced a gray scale image caused by the density of the pins against the white background. This contrast was not attributed to the shadows caused by light striking the pins.

U.S. Pat. No. 4,654,989 to Fleming (1987) was a variation in which a transparent plate was placed a spaced distance from the heads of the pins in the front perforated plate and the pins were of such length that when their heads contacted the inside surface of the transparent plate, a short section of their shanks still protruded from the back of the rear perforated plate. The pins were thus prevented from falling out of their places in the perforated plates completely.

A three dimensional image could be made with the pin screen in a horizontal orientation as in the earliest prior art discussed. This image remained only when the object creating it still pressed against the surface of the pin ends. The pin screen could also be set up vertically and an impression made by horizontally pressing an object into the surface of the ends of the pins protruding from the rear perforated plate of the device. This impression would remain even after the object was removed, provided the pin positions were not disturbed. Unfortunately, it was easy to disturb those impressions by shaking the device lightly or tipping it away from the vertical. The inventor recalls many individuals wishing that a more permanent yet easily corrected or altered impression was possible.

The inventor (1995) had occasion to make a large pin screen for a non-profit science center in which the prototype had a movable transparent plate between the fixed transparent plate and the heads of the pins. This allowed the pin screen to be reset while still in a vertical position. This arrangement only allowed for small corrections in an impression. It was possible to slip a small thin tool between the movable plate and the heads of the pins and push the pins back to a different position provided no other pins were in the way.

Gauge pin arrays which are similar to pin screens have been used to measure the contours of feet for the production of inner soles. These arrays produce a three dimensional impression. U.S. Pat. No. 4,454,618 to Curchod (1984) solves the problem of retention of pins in a displaced position in the gauge pin array by utilizing an inflatable tube which presses against retaining strips that communicates that pressure to floating wedges capable of pressing against the shanks of the pins. The pneumatic device is costly and does not lend itself to being easily employed in a pin array with pin spacing ¹⁄₁₆" or less. The pin spacing in the Curchod device is approximately ¹⁄₄₁" to ⅜₄1 .

Similarly, U.S. Pat. No. 4,876,758 to Rolloff (1989) and U.S. Pat. No. 5,689,446 to Sundman et al. (1997) still use retention devices which require enough space between the pins to insert inflatable rubber tubing to put retention pressure on the pin shanks. All of these devices use an inflatable diaphragm to push against the heads of the pins. Such diaphragms are not suited for the movement of single or small groups of pins a great distance or the creation of narrow lines or forms as would be possible using a card or a form such as a cookie cutter. Prior art U.S. Pat. No. 5,092,591 to Tol (1992) similarly uses a rubber element which is clamped around a large pin to restrict its movement. It also is not practical for very small pin spacing.

Other prior art includes picture toy devices as in U.S. Pat. No. 3,568,357 to Lebensfeld (1971), UK Patent Application 2,037,471 of Li (1980) , and U.S. Pat. No. 5,391,105 to Jones (1995). Lebensfeld uses removable light conducting pegs and a perforated rubber sheet behind one perforated plate to hold the pegs in place. It is hard to put the pegs in any intermediary positions in the rubber sheet The devices of li and Jones use two parallel perforated plates with axially aligned apertures and plastic light conducting pegs. Li uses removable pegs which are frictionally held upon engaging the apertures in the rear plate. As with Lebensfeld's device, such pegs are capable of being easily misplaced due to their small size, or are even potentially hazardous if young children were to swallow them. Jones captures pegs between the perforated plates using a ridge around the center section of a peg. The ridge creates a peg diameter greater than the diameter of the apertures in the plates preventing the peg from being totally withdrawn from the plates. Jones uses a peg tapered on both ends to frictionally fit and stay in position. Li's and Jones' devices have only one or two positions in which an element is retained and thus also are not suitable if positions between those extremes are desired.

SUMMARY OF THE INVENTION

This invention relates to new and useful improvements in three dimensional pin screens.

A principal object of the present invention is to provide a three dimensional pin impression which can be retained given any orientation of the pin impression device until that impression is altered. Another object is to provide pins with caps and heads allowing for impressions to be made from either side of the pin impression device without those pins being capable of completely exiting the pin impression device.

A further object is to provide for existing impressions to be easily corrected or altered to achieve any three dimensional shape within the resolution and pin protrusion parameters of a given pin impression device.

Still another object is to provide for a pin impression device whose pins can have caps, heads, and shanks which are colored and caps and heads which have various shapes to give different definition and appearance to the impressions created.

Further objects and advantages of my invention will become apparent from a consideration of the drawings and ensuing description.

Accordingly, the present invention remedies the disadvantages of the prior art and provides for a pin screen device which can be used in any orientation and retain the three dimensional impressions made in it. The impressions can be altered by pushing the pins from either the head ends or the cap ends on their respective sides of the device. The pin screen has two parallel spaced perforated plates containing axially aligned apertures. A plurality of pins with lengths greater than the combined spacing of the plates and their thickness fills designated pin screen apertures. The pins having caps and heads, are selectively displaced when the exposed cap or head ends come into contact with a three dimensional object pressed into either side of the device. The pins are held in their selected displaced positions by a magnetic or pressure strip in contact with the shanks of rows or a row of the pins. The strips are located between and perpendicular to the plates. All rows of pins are engaged by the strips.

BRIEF DESCRIPTION OF THE DRAWINGS

Similar figures have the same number but distinct alphabetical suffixes.

DETAILED DESCRIPTION OF THE DRAWINGS

Figure 1A:
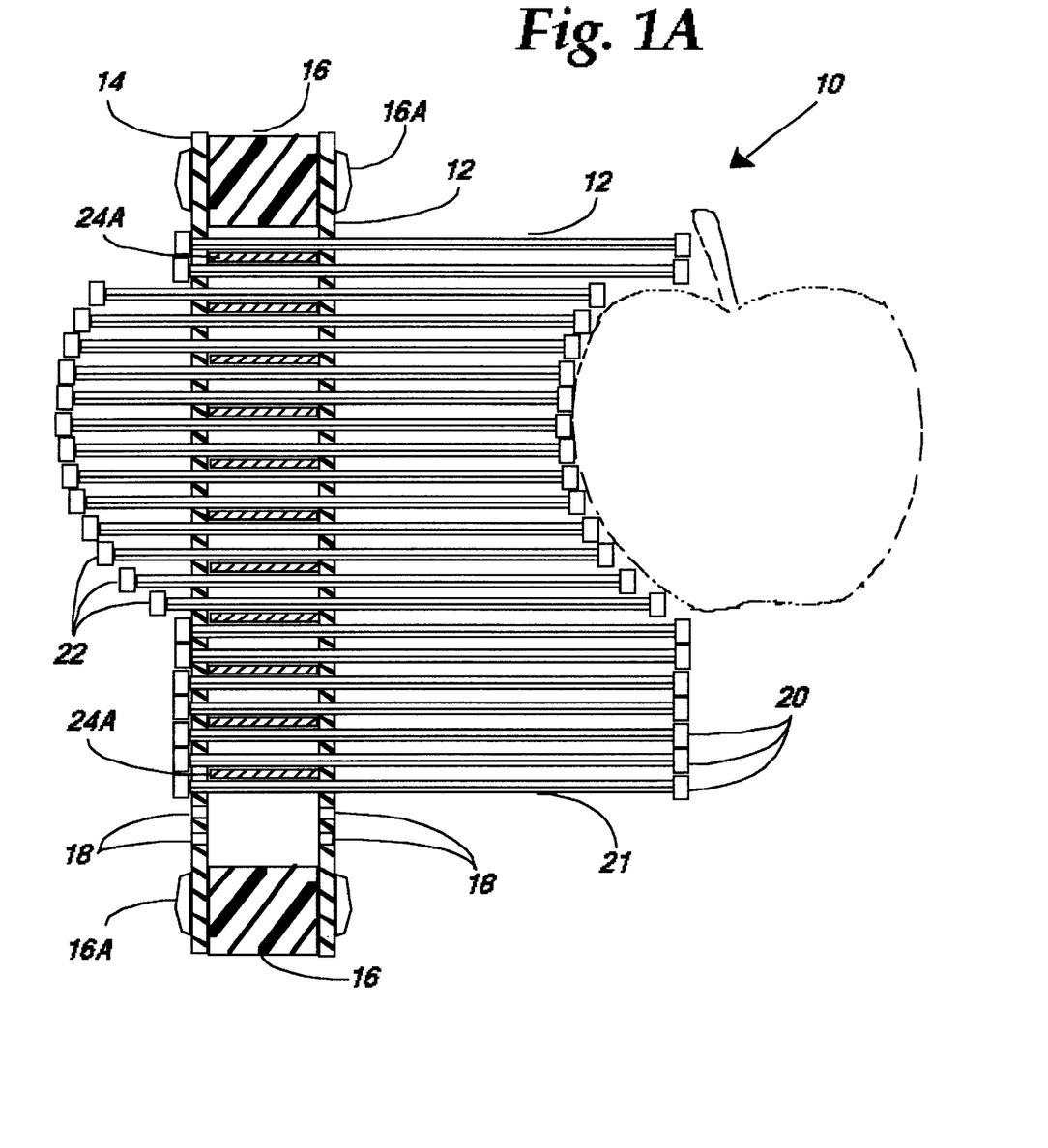
FIG. 1A shows a cross sectional view with magnetic strips between adjacent rows of pins.
Figure 4:
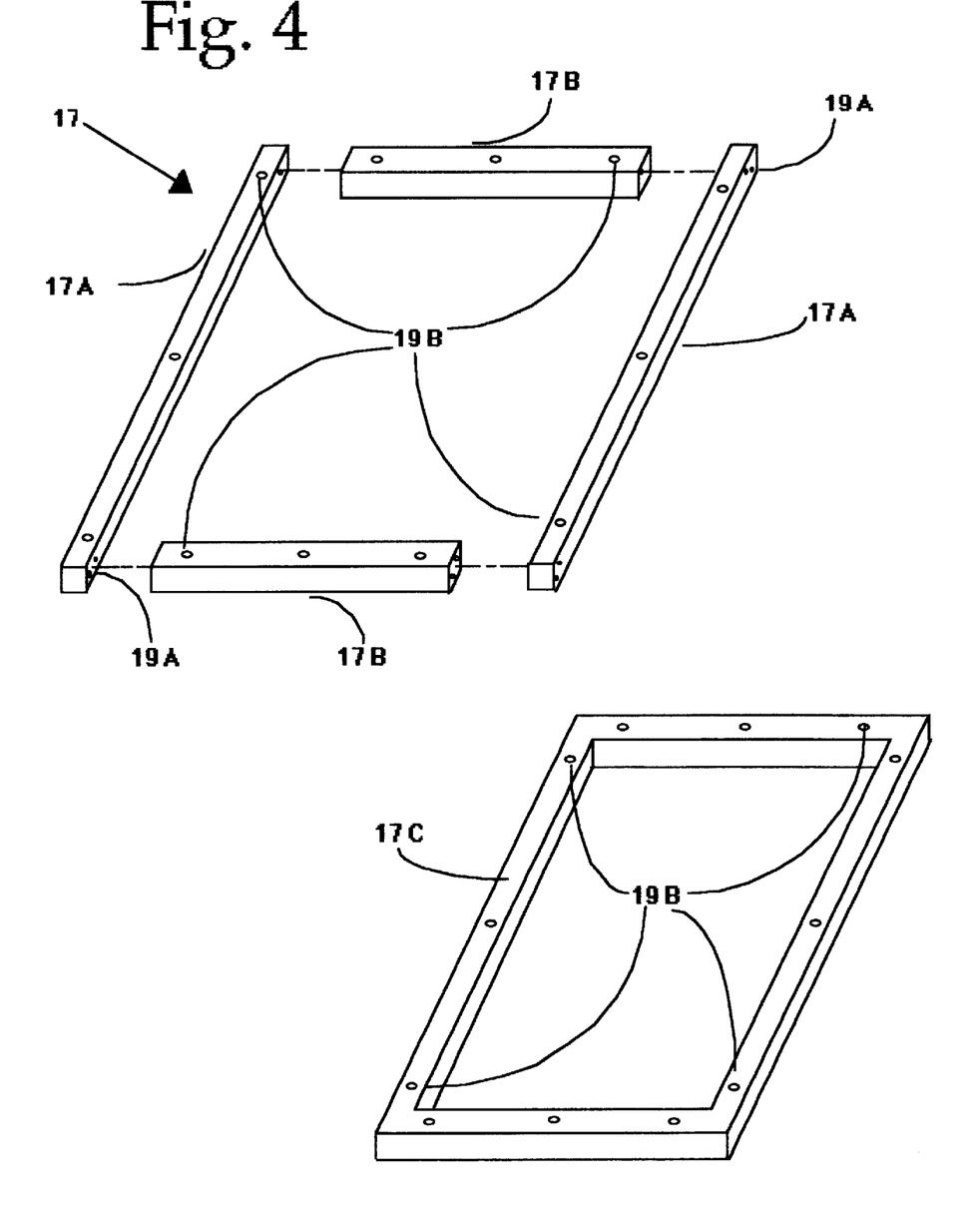
FIG. 4 shows an exploded perspective view of an embodiment which uses a frame.

FIG. 1A is a cross sectional side view of one embodiment, according to the present invention. A pin screen 10 is composed of two rigid spaced parallel perforated plates 12 and 14 separated by plate spacers 16. Plates may be of plastic or non-magnetic metal. Plater spacers are of rigid plastic and may be fastened to the plates with mechanical fasteners 16A In larger pin screens frames of plastic or metal tubing may be employed. A frame 17 may have a symmetrical or asymmetrical configuration. As shown in FIG.4, frame 17 has a rectangular mid frame with sides 17A and ends 17B. Bracket frame 17C overlays the mid frame on both sides.

Mid frame side fastener holes 19A are used with appropriate fasteners to connect sides 7A with ends 7B. Holes 19B are provided for appropriate fasteners to hold and align the bracket frame to mid frame to bracket frame stack.

Apertures 18 in the perforated plates in FIG. 1 are positioned in parallel rows of a nonstagered pattern or a staggered pattern with alternate rows aligned. Each aperture in perforated plate 12 is axially aligned with a corresponding aperture in perforated plate 14. A plurality of pins 21 with heads 20 are inserted through apertures 18 in plate 12 and extend through the corresponding axially aligned apertures 18 in plate 14. Pins 21 are fitted with caps 22 to prevent their movement back out of both perforated plates and consequent loss. The spacing between plates 12 and 14 is less than the length of pins 21 and is sufficient to insure that pins remain perpendicular to the plates.

As illustrated in FIG. 1A, pins 21 with head ends 20 can be displaced to the left by pressing an object against them from their right. Such an object, in this case an apple, will produce a three dimensional impression in the pins protruding out to the right of plate 12. The corresponding displaced pins 21 with cap ends 22 protruding to the left of plate 14 will recreate a three dimensional image of the object creating the impression which is in this case, the apple.

In FIG.1A, pins 21 are held in their displaced positions in the respective apertures 18 of plates 12 and 14 by magnetic attraction between the shanks of the pins and magnetic strips 24A. Strips 24A have a width perpendicular to and approximately equal to the distance between the two plates 12 and 14. Strips 24A are magnetic on both sides. The strips contact the shanks of adjacent rows of pins extending not less than the length of either of the pin filled rows and have a thickness approximately equal to the distance between the shanks of the pins of adjacent rows. Magnetic strips 24A, which can be two joined one sided magnetic strips, are set to capture all of the rows of pins of the pin impression device. If the total number of rows is odd, the magnetic strip contacting the last row of pins is magnetized only on the side contacting the pins.

Pins are of a material which will be attracted to a magnet, preferably chromium plated steel or magnetic stainless steel or plastic with a magnetic core. The pin shanks can be +e,fra 2+ee " to 3" in length and the plates can be separated by about ½" to ¾" to allow at least a 1" range of displacement of the pins. Pin shanks may range in size from approximately 0.032" in diameter to 0.125" in diameter and the apertures in the plates will be larger than the diameter of the shanks. For a pin shank with a diameter of approximately 0.0625", the spacing between the apertures from center to center is 0.125". The pin heads and caps are sufficiently large to prevent the heads or caps from passing through the apertures in the plates. The pin cap ends and the pin heads can be of different shapes but will be flat or rounded on the ends and not pointed. This prevents injury or damage to the objects which are pressed against them.

Figure 2A:
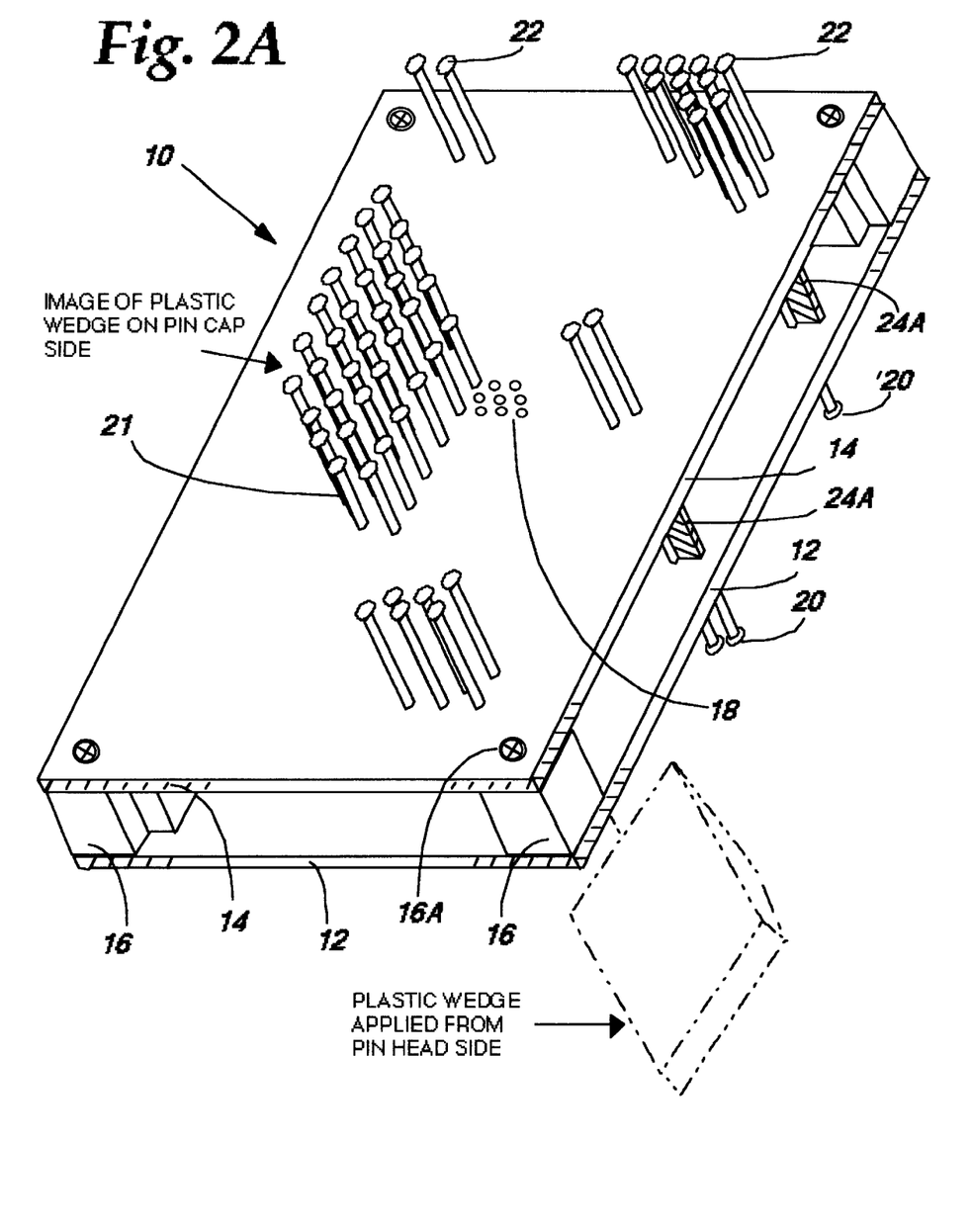
FIG. 2A shows a perspective view illustrating the orientation of the magnetic strips with respect to the pins with side panels removed.

Pin cap ends or pin head ends can be colored as well as pin shanks. This provides distinctive differences. In contrast and appearance. Pin caps and or hands may be made of colored plastic, even plastic shrink tubing. Such tubing also acts as an extended cap or head for the pin. Using shrink tubing may require the pins to be longer to maintain the same range of displacement FIG. 2A is a perspective view of the embodiment of FIG. 1A tilted to the right about 30 degrees from the vertical. FIG. 2A shows a three dimensional configuration of pin cap ends 22 of pins 21 as viewed from the left side of the tilted embodiment of FIG. 1A. The three dimensional configuration is in this case a three dimensional image of a plastic wedge formed by the displacement of the pin cap ends 22 caused by the impression of the wedge against the pin head ends 20 extending from the right side of the pin screen illustrated in FIG. 2A.

This three dimensional image of the plastic wedge created by the displaced cap ends 22 of pins 21 will be retained by magnetic attraction of the pin shanks to the magnetic strips 24A until the positions of the pins are changed by pressure applied to either ends of the pins, thus varying the position illustrated in FIG. 2A. Pins 21 can be displaced from either side of the pin screen. Displacement stops when a pin cap end contacts the surface of plate 14, or a pin head end contacts the surface of plate 12.

Figure 1B:
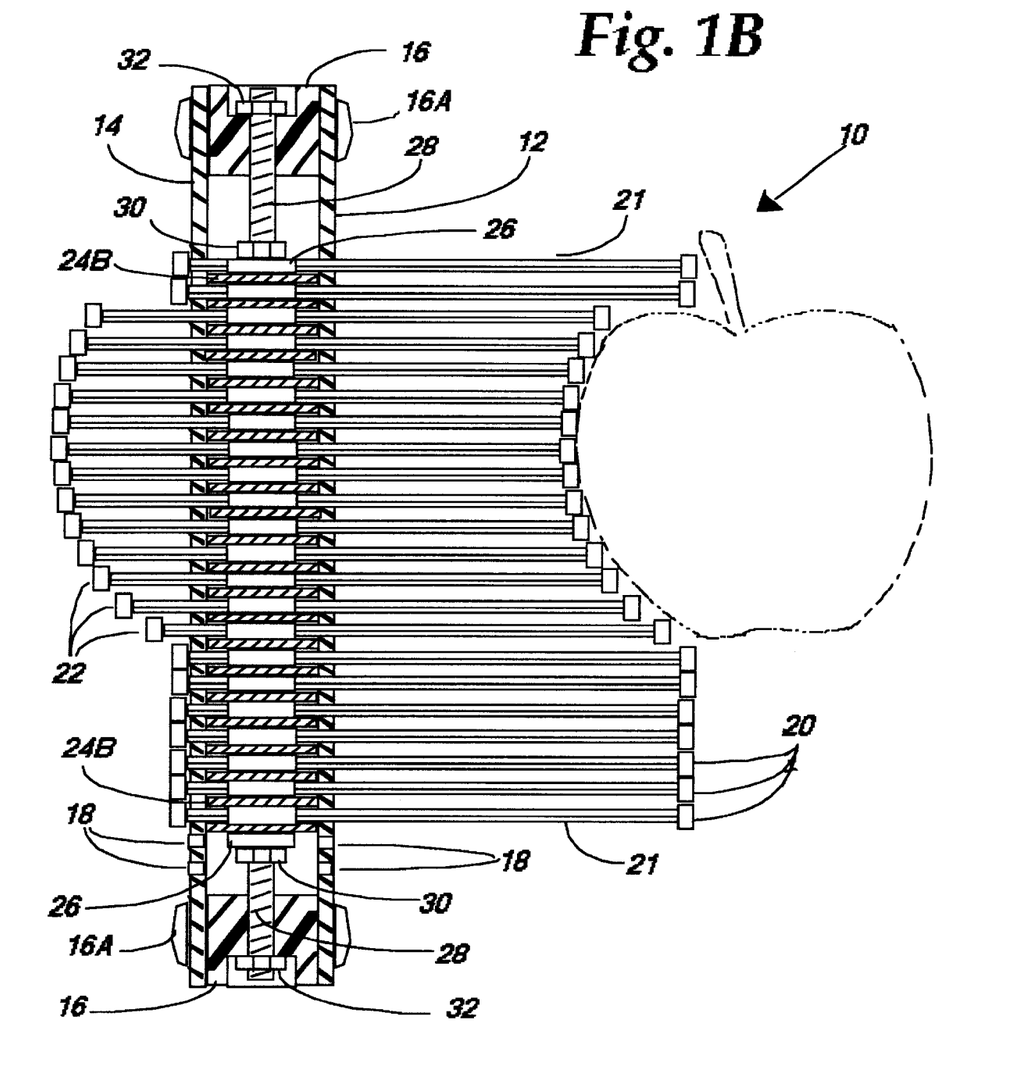
FIG. 1B shows a cross sectional view with a threaded rod and pressure strips contacting each row of pins.

FIG. 1B illustrates an alternative non-magnetic embodiment of the invention. In this embodiment, the shanks of each row of pins are held under slight pressure by rigid strips 24B pressing against them. The pins may be made of plastic. The strips are between perforated plates 12 and 14, parallel to the rows of pins and approximately equal in width to the distance between the plates. Strips 24B have a thickness approximately equal to the distance between the shanks of adjacent rows of pins.

Additionally, the strips are of a length which allows them to protrude beyond the ends of the rows of pins. Each protruding end of strip 24B has a hole through which a threaded rod 28 passes. A pressure strip spacer 26 is located on each side of the protruding strip end and is aligned with the hole through the end. Clamping nuts 30 on screw 28 secure strip spacers 26 and strips 24B. An identical threaded rod and clamping arrangement secures the opposite ends of the strips. The result is a ladder-like device. Threaded rods 28 of the device extend into and through spacers 16 of the invention. A recess in the outside edge face of spacer 16 accommodates each threaded rod 28 and an adjustment nut 32.

Tightening down on adjustment nuts 32 at the top in FIG. 1B and loosening up on adjustment nuts 32 at the bottom of FIG. 1B allows all strips 24B to be moved ladder-like against the shanks of the pins in each row above the strips. Adjusting the pressure of the strips against the shanks of the pins by turning adjusting nuts 32 both proportionally, produces any desired degree of resistance to impression by an object on the pins. The pressure of the strips on the shanks of the pins also allows pin screen 10 to be moved into any orientation and still retain any impression made into it. Operation of pin screen 10 in FIG. 1B is the same as pin screen 10 in FIG. 1A. The only difference is the provision for adjusting the resistance of the pins to impression in FIG. 1B.

Figure 2B:
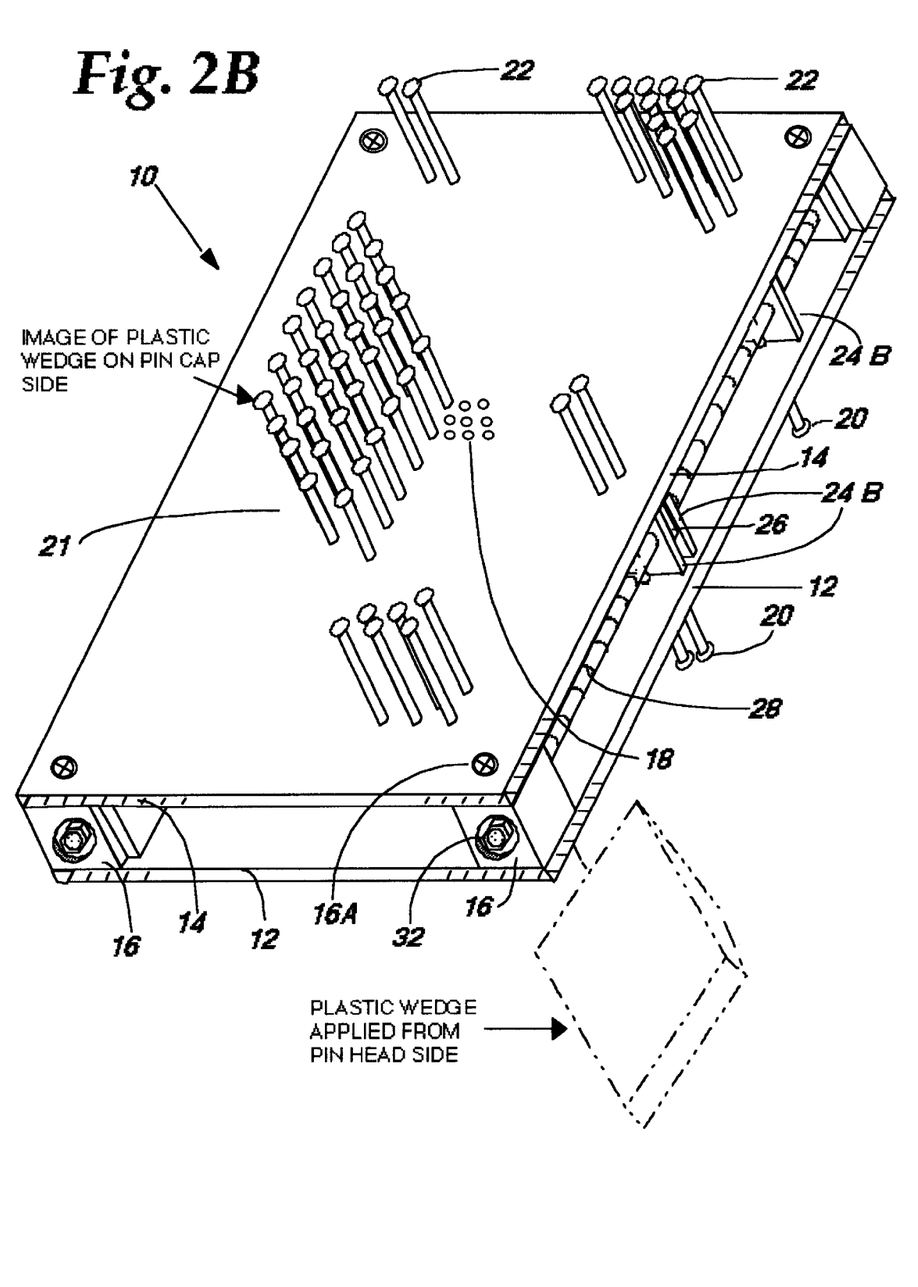
FIG. 2B shows a perspective view illustrating the orientation of the pressure strips and one of the threaded rods.

FIG. 2B is a perspective view of the embodiment of FIG. 1B tilted to the right 30 degrees from the vertical. FIG. 2B illustrates the relationship of pressure strips 24B and pressure strip spacers 26 to threaded rod 28 and the relationship of adjustment nuts 32 to plate spacers 16. The relationship of pins 21 and spacers 16 to plates 12 and 14 is the same as in FIG. 1A.

Figure 3:
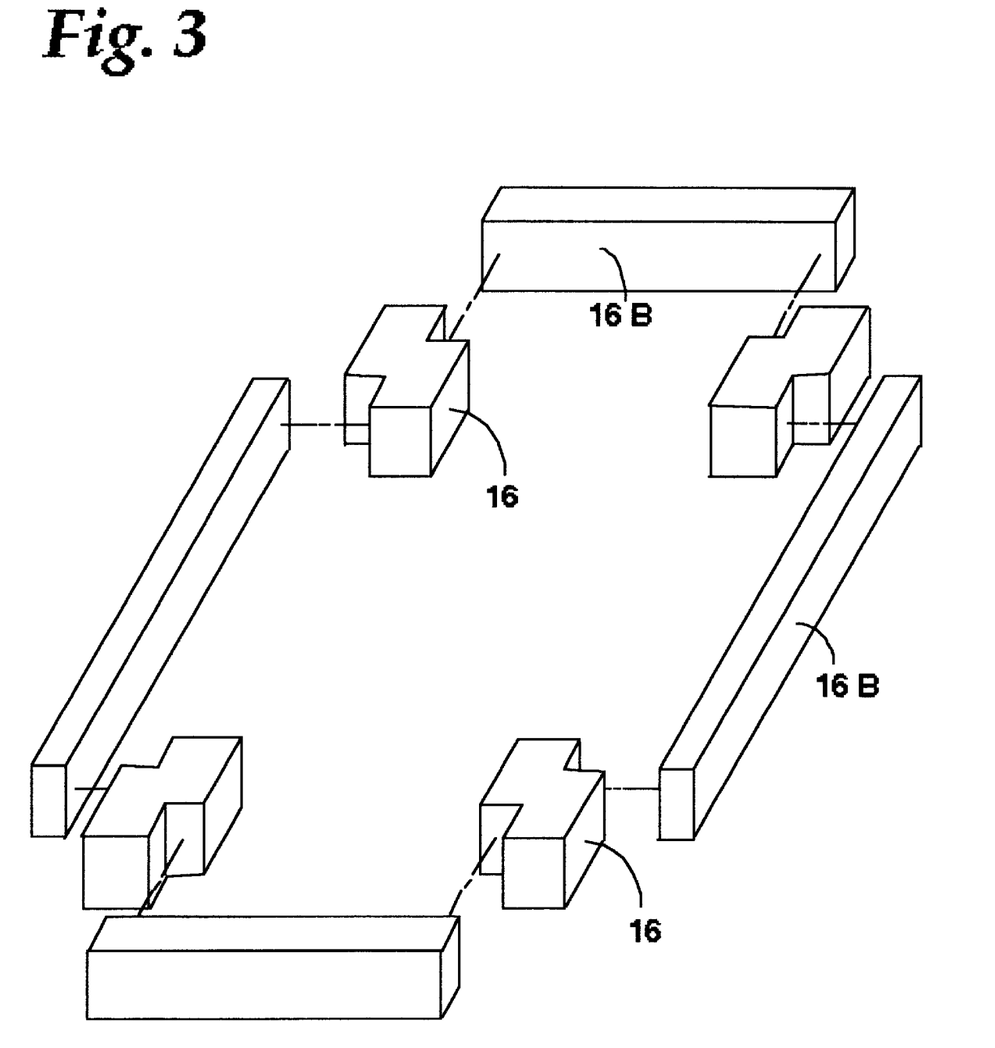
FIG. 3 shows an exploded perspective view of an embodiment which uses plate spacers and side panels.

FIG. 3 shows an exploded view of plate spacers 16 and side cover plates 16B. This embodiment may be used for smaller models of the invention which are generally less than 8 inches tall and 6 inches wide.

FIG. 4 shows an exploded perspective view of a frame arrangement used for larger models of the invention which require greater dimensional stability and durability.

In operation, the pin screen device is used in the following way according to the present invention. By hand, a user first holds the device by its edges or rests the device on its edges against a solid surface and insures the outside faces of plates 12 and 14 (FIG. 1A) are free from any obstructions which prevent movement of pins 21.

The user then presses all of the pins on one side of the device until pin head ends 20 contact plate 12 or pin cap ends 22 contact plate 14 opposite them. This resets all of the pins to one side.

Next, the user can take the device by its edges with both hands and press the protruding pin head ends 20 or pin cap ends 22 onto the surface of a three dimensional object.

Additionally, the user can either hold the pin screen device free in one hand or steady its edges on a table using one hand and press an object or fingers into protruding pins head ends 20 or pin cap ends 22.

Pin screen 10 can also be clamped suitably on its edges to support it so both hands of the user can easily manipulate pins 21 from either side. The user pushes their fingers or any objects into the protruding pin head ends 20 or pin cap ends 22 of the device to get the impression and resulting three dimensional image desired. If pins 21 are pushed in too far, the impression can be corrected by pushing the pins back from the other side. In this way, the user can model a variety of intaglio and cameo forms on either side of the pin screen device.

The non-magnetic pin screen is operated in a like manner. If there is not enough resistance to the movement of the pins 21, it is necessary to turn top adjustment nuts 32 clockwise on screen 10 as in FIG. 1B and loosen bottom adjustment nuts 32 counter clockwise the same amount. Periodically the resistance of the pins is checked to prevent overtightening.

The pin screen may be set in a case which allows the user to access only one side of the unit. In this case a platen or a roller is caused to press against pin cap ends 22 if pin head ends 20 form the surface being accessed. A lever moved by the user causes the platen to reset all the pins 21. A similar lever can move a roller over all of the pins, resetting them.

EXAMPLES

Thus the reader will see that this three dimensional pin screen provides a highly desirable interactive three dimensional imaging experience.

1) The invention can be used as a mold maker by providing a plastic cover sheet and surrounding dam into which a molding compound can be poured.

2) A three dimensional shape can be created and recorded with a three dimensional digitizer to be later used in all types of topographical inquiries.

3) The pins in the non magnetic embodiment can be made of rigid plastic, hollow or solid and transparent, translucent or opaque.

4) The sizes of the pins in 3) and consequent pin screens can be larger with pin diameters up to 4" and lengths of up to 3'. A resulting pin screen might have a dimension of 60' by 35'. This could be seen as a sculptural billboard. Using hollow translucent pins with interior lighting would light up such a structure at night.

5) The invention can be used on one side only when provided with a resetting mechanism that returns the pins to their extended positions in front of the user. Such a resetting mechanism may be a movable platen which contacts the head ends of the pins. This platen can be retracted a distance from the perforated plates which still allows the pins full movement. This platen obviates the necessity for a cap end on the pins while still taking advantage of the magnetic or pressure strips to retain impressions in any orientation of the device.

6) The invention can be used as a tool for stop motion animation.

7) The magnets can be very thin sheets made from rare earth metals permiting smaller diameter pins resulting in greater resolution.

It should be understood, however, that even though these numerous characteristics and advantages of the invention have been set forth in the foregoing description, together with details of the structure and functions of the invention, the disclosure is illustrative only, and changes may be made in detail, especially in matters of shape, size, chemistry, and arrangement of parts within the principal of the invention to the full extent indicated by the broad general meaning of the terms in which the invention is expressed.

Reference Numerals in Drawings
10 pin screen housing
14 second perforated plate
16A plate attachment fastener
17A mid frame side
17C structural bracket frame
19A mid frame side fastener holes
pin caps
24A magnetic strips
26 pressure strip spacer
30 pressure strip clamping nut
12 first perforated plate
16 plate spacer
16B side cover plate
17B mid frame end
18 plate aperture
19B mid frame to bracket frames fastener holes
22 pin ends
24B pressure strips
28 threaded rod
32 adjustment nut

What is claimed is:

1. A pin screen capable of multiple orientations comprising:

first and second spaced parallel axially aligned apertured conjoined plates adapted to receive and hold a plurality of pins inserted into apertures located on said first and second plates, spacer means holding said first and second plates apart, said apertures being aligned such that a pin inserted through said aligned apertures in each of said plates will be perpendicularly oriented to said plates, said apertures in each of said plates being aligned in rows, said rows being in one of a staggered and non-staggered pattern, a plurality of pins each having a shank each of said shanks, having a diameter, said apertures being larger than the diameter of said shanks of said pins, said shanks being inserted through the aligned apertures in said first and second plates, each of said shanks having a head on one end thereof, said heads of said shanks abutting against said first plate, an opposite end of said shanks of said pins protruding through said second plate, said opposite ends of each of said shanks of said pins having a cap, said heads and said caps being larger than the diameter of said apertures for preventing said pins from passing out of said plates, said first and second plates being spaced apart from each other by a distance of about three times to about ten times less than the total length of said pins, said spacing of said plates being sufficient to maintain said pins inserted through said aligned apertures in said first and second plates, said plates being adapted to allow selective displacement of said pins, said pins being capable of being displaced by pressing a three-dimensionally configured object against said pin caps and portions of said pin shanks projecting beyond said second apertured plate for displacing away from said first apertured plate, said pin heads of said pins, for causing the displaced pin caps to create a three dimensionally configured image of said object, said pins being composed of a material capable of attraction to a magnet, said pins being capable of being held in a displaced position by magnetic attraction of said shanks of said pins to magnetic strips which lie within the space between said two plates, said magnetic strips being equal in width to the spacing between said plates and of a thickness less than the total distance between the apertures of one row and an adjacent row and of a length whereby said strips project beyond the pin filled apertures of said rows, said magnetic strips contacting said shanks of said pins within the spacing of said plates wherein every two said adjacent rows of pins have their own said magnetic strip for said contact, said pins being capable of retaining said three-dimensionally configured image in any orientation of said conjoined plates, said pins being returnable to a position in which said pin heads are abutting against said first apertured plate by pressing said pin heads to abut against said first plate.

2. A pin screen according to claim 1, wherein said apertures are spaced about ⅛ inch center to center and said heads and caps are about ⅛ inch in diameter.

3. A pin screen according to claim 1, wherein said pin heads and caps are colored for achieving a colored three dimensional image of the three dimensional configured object applied to said screen.

4. A pin screen according to claim 1, wherein the apertures in adjacent aligned rows are not staggered.

5. A pin screen according to claim 1, wherein said pins are composed of plastic with a magnetic core.

6. A pin screen according to claim 1, wherein the number of total rows is odd, and the magnetic strip contacting said shanks of the last row of said pins is magnetized only on a side contacting said last row.

7. A pin screen for creating a three dimensional pattern of an object applied thereto comprising:

first and second spaced parallel axially aligned apertured conjoined plates adapted to receive and hold a plurality of pins inserted into apertures located on said first and second plates, spacer means holding said first and second plates apart, said apertures being aligned such that a pin inserted through said aligned apertures in each of said plates will be perpendicularly oriented to said plates, said apertures in each of said plates being aligned in rows, said rows being in one of a staggered and non-staggered pattern, a plurality of pins each having a shank, each of said shanks having a diameter, said apertures being larger than the diameter of said shanks of said pins, said shanks being inserted through the aligned apertures in said first and second plates, each of said shanks having a head on one end thereof, said heads of said shanks abutting against said first plate, an opposite end of said shanks of said pins protruding through said second plate, said opposite ends of each of said shanks of said pins having a cap, said heads and said caps being larger than the diameter of said apertures for preventing said pins from passing out of said plates, said first and second plates being spaced apart from each other by a distance of about three times to about ten times less than the total length of said pins, said spacing of said plates being sufficient to maintain said pins inserted through said aligned apertures in said first and second plates, said plates being adapted to allow selective displacement of said pins, said pins being capable of being displaced by pressing a three-dimensionally configured object against said pin caps and portions of said pin shanks projecting beyond said second apertured plate for displacing away from said first apertured plate, said pin heads of said pins, for causing the displaced pin caps to create a three dimensionally configured image of said object, said pins being capable of being held in a displaced position by pressure on said shanks of said pins in said apertures by rigid pressure strips which lie within the space between said two plates, said strips having a first end opposite a second end, and being equal in width to the spacing between said plates and of a thickness less than the total distance between apertures of one row and an adjacent row and of a length whereby said strips project beyond said pin filled apertures of said rows, said strips contacting said shanks of said pins within the spacing of said plates wherein every said row of said pins has one said strip for said contact, said strips being held apart by spacers located between said first ends and between said second ends and linked together by a first threaded rod passing through said first ends and said spacers and a second threaded rod passing through said second ends and said spacers, said strips, spacers, and threaded rods forming a ladder like assembly wherein said strips are further held in place by clamping nuts threaded onto each end of said threaded rods and abutting against said strips, said threaded rods extending through said spacer means of said pin screen and having an adjustment nut which is secured to said ends of said threaded rods and resting in a counterbored depression in said spacer means, said ladder like assembly having a top end and a bottom end, and being capable of having said adjustment nuts tightened on said top end and loosened on said bottom end whereby pressure is exerted by said rigid strips uniformly against all shanks of said plurality of pins, said pressure being sufficient for said pins to retain said three dimensionally configured image in any orientation of said conjoined plates, said pins being returnable to a position in which said pin heads are abutting against said first apertured plate by pressing said pin heads to abut against said first plate.

8. A pin screen according to claim 7, wherein said pins are solid plastic.

9. A pin screen according to claim 7, wherein said pins are tubular plastic.

10. A pin screen according to claim 7, wherein said apertures are spaced about ⅛ inch center to center and said heads and caps are about ⅛ inch in diameter.

11. A pin screen according to claim 7, wherein the apertures in adjacent aligned rows are not staggered.

* * * * *